(12) United States Patent
Shively et al.

(10) Patent No.: US 7,117,010 B2
(45) Date of Patent: Oct. 3, 2006

(54) WIRELESS PHONE POWERED INDUCTIVE LOOPSET

(75) Inventors: David Shively, Smyrna, GA (US); Mel Frerking, Norcross, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 103 days.

(21) Appl. No.: 10/448,036

(22) Filed: May 29, 2003

(65) Prior Publication Data

US 2004/0240696 A1    Dec. 2, 2004

(51) Int. Cl.
*H04M 1/00* (2006.01)
*H04B 15/00* (2006.01)
*H04R 25/00* (2006.01)
*H04M 11/00* (2006.01)

(52) U.S. Cl. .............. 455/556.1; 455/420; 455/550.1; 455/557; 455/100; 455/573; 455/127.1; 329/52; 381/94.6; 381/323

(58) Field of Classification Search .............. 455/420, 455/423, 426.1, 74.1, 550.1, 556.1, 557, 455/572, 100, 573, 127.5, 574, 127.1, 575.2, 455/351; 379/52; 381/94.6, 312, 316, 315, 381/322, 314, 331, 94.1; 333/124, 17.3, 333/32; 320/138, 117, 108
See application file for complete search history.

(56) References Cited

U.S. PATENT DOCUMENTS

| | | | | | |
|---|---|---|---|---|---|
| 5,575,682 | A | * | 11/1996 | Alexander | 439/500 |
| 5,786,106 | A | * | 7/1998 | Armani | 429/98 |
| 5,876,242 | A | * | 3/1999 | Williams | 439/500 |
| 5,903,850 | A | * | 5/1999 | Huttunen et al. | 455/557 |
| 6,118,882 | A | * | 9/2000 | Haynes | 381/374 |
| 6,307,945 | B1 | * | 10/2001 | Hall | 381/315 |
| 6,381,308 | B1 | * | 4/2002 | Cargo et al. | 379/52 |
| 6,616,300 | B1 | * | 9/2003 | Hrabal | 362/258 |
| 2004/0136555 | A1 | * | 7/2004 | Enzmann | 381/314 |

\* cited by examiner

*Primary Examiner*—Daniel Swerdlow
*Assistant Examiner*—Dionne H. Pendleton
(74) *Attorney, Agent, or Firm*—Gardner Groff Santos & Greenwald P.C.

(57) ABSTRACT

An induction-type loopset is provided that is connectable to a wireless device. The loopset contains a first coil electromagnetically coupled to a t-coil hearing aid and an impedance-matching device coupled to the first coil. The impedance-matching device is responsive to an audio signal from the wireless device. The induction-type loopset is powered from the power source of the wireless device. The power source is responsive to an activation state of the wireless device.

11 Claims, 6 Drawing Sheets

WIRELESS PHONE POWERED INDUCTIVE LOOPSET

BACKGROUND OF THE INVENTION

1. Field of the Invention

This invention relates to providing a power source for an inductive loopset. More particularly, this invention relates to providing operating power to an inductive loopset using battery power provided by a wireless phone.

2. Description of Related Art

Telecoil (T-coil) hearing aid users commonly experience interference from the high-frequency electromagnetic signal emitted by wireless phones when the phone is placed in close proximity to the t-coil. The interference—a "buzz" or "hum" in the hearing aid—makes the use of wireless phone handsets difficult. To assist these users, audio induction systems were created. Audio induction systems operate using the principles of electro-magnetics. When an electrical current is amplified and passed through a wire loop, an electromagnetic field is generated around the wire that varies in direct proportion to the amplitude and frequency of the signal. If another wire (or wire loop) is placed in proximity to this field, an identical current will be passed (induced) to the wire. Finally, the current representative of the original audio signal is amplified for hearing.

Personal loopsets were created to apply the audio induction principle to wireless devices so that the wireless phone could be used with t-coil hearing aids. As shown in FIG. 1, the coil 40 of loopset 5 is worn around the user's neck. The coil 40 is coupled to an impedence-matching device 33 inside the housing 30. The impedance-matching device 33 receives a voice signal from the wireless phone 10, transmits the corresponding electromagnetic field to the coil 40, and ultimately to a hearing aid placed in proximity to the coil 40.

Current designs of loopsets use small cell batteries to power the electronics of the loopset. As shown FIG. 2, the battery 34 provides operating power to the loopset 5 when the terminal 41 has been inserted into the jack 42. The insertion of the terminal 41 completes an electrical path, which allows the loopset 5 to produce an induction current.

The current designs have inherent problems that, if removed, would make major strides in the loopset technology. First, in order for the loopset 5 to operate, the terminal 41 must be plugged into the jack 42. Using this approach, a hearing impaired user is almost forced to constantly wear the loopset to hear an incoming call to the wireless phone 10. This means that the coil 40 is constantly emitting an electromagnetic magnetic field if the loopset is being worn and the battery power is constantly being depleted. This leads to inconvenience and a short battery life. Thus, a user is forced to replace the battery often. However, if a user decides to keep the loopset in a pocket or a bag, to conserve battery power, a user must fumble to put the loopset on if a call is received while the loopset is not being worn.

Thus, the inventors have discerned that there is a need to address the above-mentioned problems by providing a loopset that is more user friendly than current configurations and overcomes the problems identified above.

SUMMARY OF THE INVENTION

As outlined above, conventional loopsets are limited in their user friendliness. Thus, it is an object of the present invention to provide a user-friendly loopset for the hearing impaired by powering the loopset using a readily available power source without causing significant reduction in the life of the power source.

This invention provides an induction-type loopset for the hearing impaired configured to connect to a wireless device. The loopset comprises a first coil configured to be electromagnetically coupled to a t-coil hearing aid and an impedance-matching device coupled to the first coil. The impedance-matching device is responsive to an audio signal from a wireless device and the induction-type loopset is selectively powered from the power source of the wireless device.

This invention also provides a power source for the wireless device that selectively supplies power to the loopset in response to an activation state of the wireless device.

This invention separately provides a method for selectively supplying power to an induction-type loopset for the hearing impaired by connecting a wireless device to the loopset and selectively supplying power to the loopset from the wireless device depending on an activation state of the wireless device. The method further provides a method for detecting a change in the activation state of the wireless device and controlling a switch based on the detecting step.

Thus, this invention provides systems and methods for powering a loopset from the power source of a wireless phone. The systems and methods of this invention take advantage of many of the features already present in wireless phone configurations. Examples of such features include battery cycle down modes and "sleep" modes of the attached wireless phone.

In the various exemplary embodiments according to this invention, power provided to the loopset is controlled by the microcontroller in the wireless phone. This method allows the loopset to take advantage of automatic power-down and battery save features provided in the wireless phone. In addition, by using the microcontroller within the wireless phone, the configuration of the loopset is simplified.

In the various exemplary embodiments according to this invention, a switch controlling power to the loopset is activated and switched using signals from the microcontroller of the wireless phone. The pattern of control of the loopset is essentially the same as the pattern of the operating modes in the wireless phone. For example, when the wireless phone is in a standby mode, no power is provided to the loopset. However, when a call is received, a signal is sent from the microprocessor of the wireless phone to activate the loopset. The loopset is then returned to the standby/off state once the call has ended and the wireless phone again enters the standby mode.

These and other features and advantages of this invention are described in or apparent from the following detailed description of the apparatus/systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

FIGS. 4–7 illustrate various embodiments of the present invention. Similar reference numbers are used for similar elements between each of the FIGS. 1–7. In this detailed description, the term "wireless phone" is used as an exemplary embodiment only. The term is intended to apply to any wireless device that has voice capability, including but not limited to devices from Research In Motion®, PALM®, Microsoft®, Dell® and cordless land-line telephones.

Figure 1:
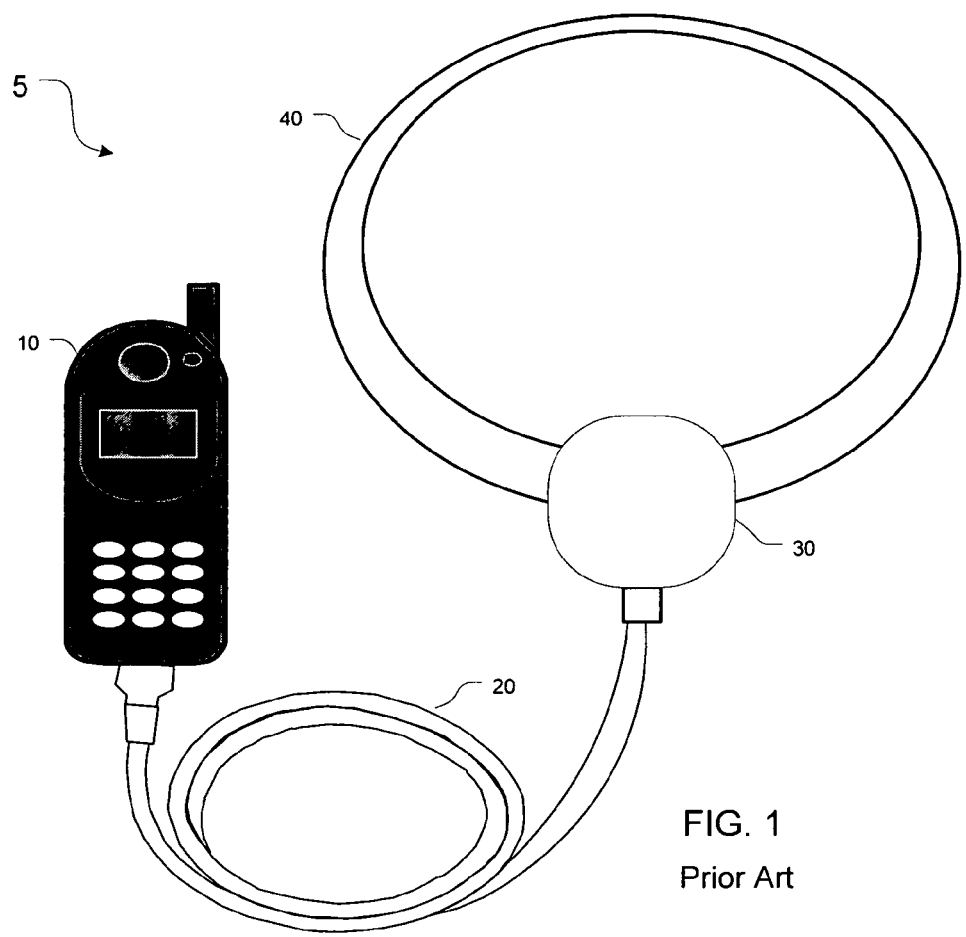
FIG. 1 illustrates the configuration of an induction type loopset for a wireless phone.
Figure 2:
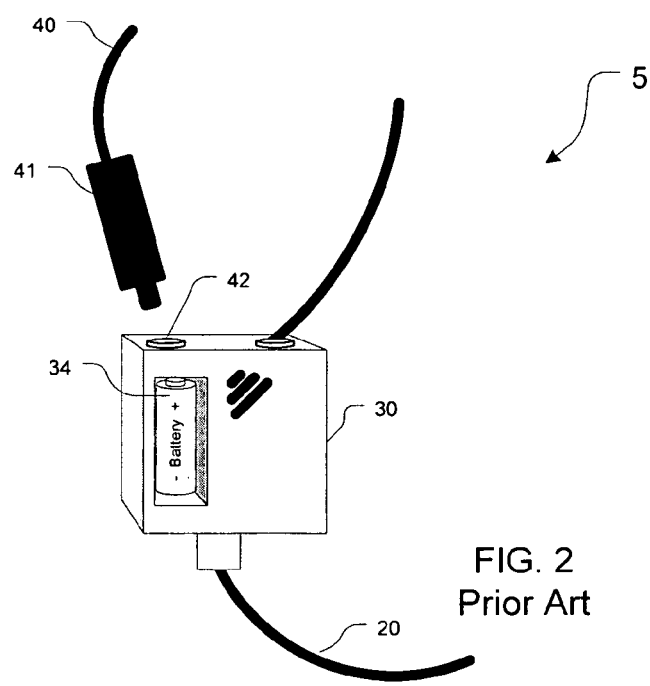
FIG. 2 illustrates a conventional loopset configuration powered by a small battery.
Figure 3:
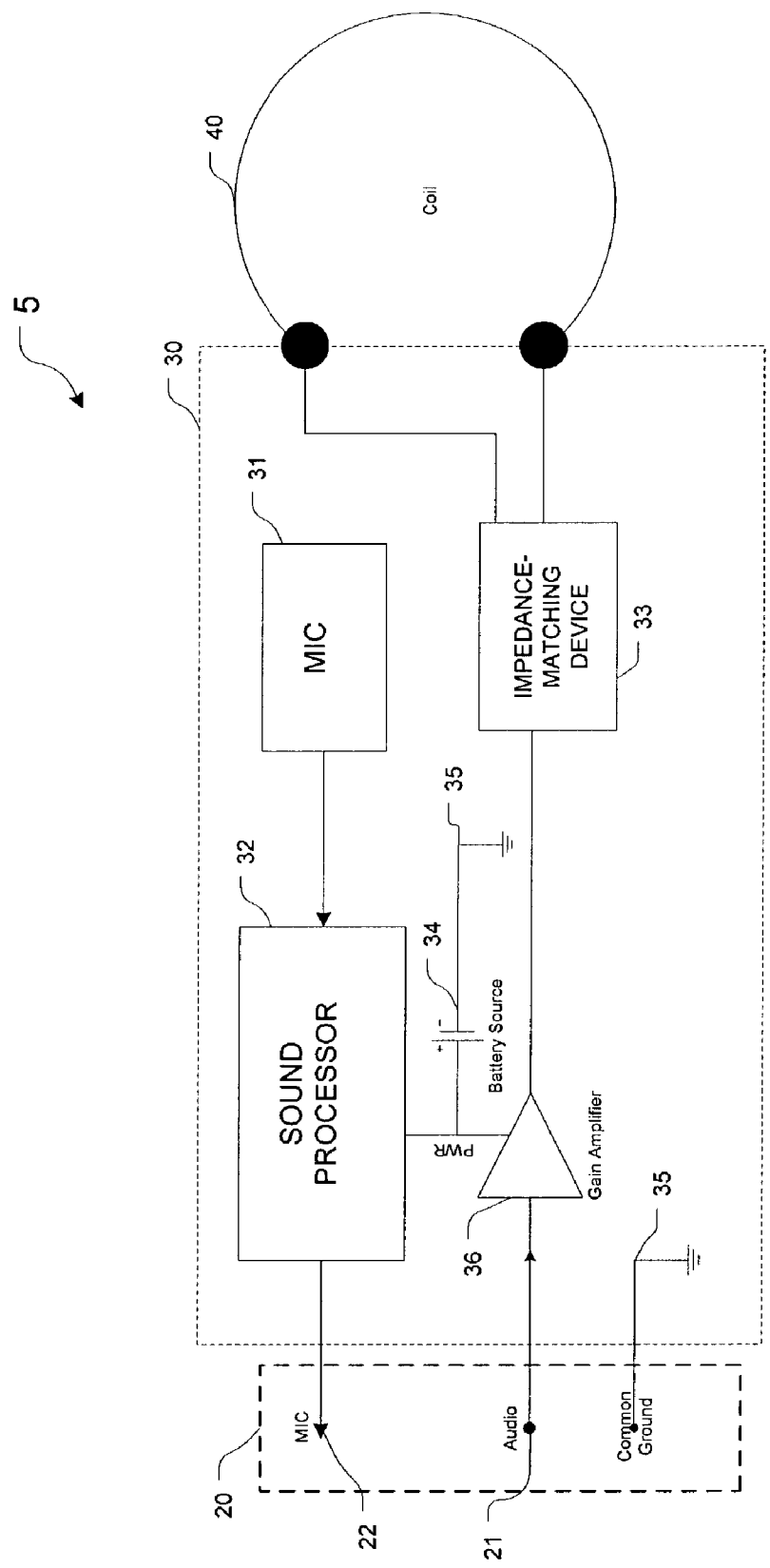
FIG. 3 is a block diagram showing the configuration of a conventional loopset powered by a small battery.

FIG. 3 illustrates the configuration of a conventional loopset 5. As shown in FIG. 3, the conventional system includes a coil 40, a housing 30 and a wire 20. The wire 20 is connected to a wireless phone that provides voice signals to the loopset 5. The housing 30 contains a microphone 31, a sound processor 32, a battery source 34, a gain amplifier 36, an impedance-matching device 33, and a common ground 35. The cable 20 contains a connection to the common ground 35 of the connected wireless phone (not shown), an audio input line 21 and a microphone-out line 22. The battery source 34 is typically a removable small battery, such as a "AAA" battery or at least one button cell.

The sound processor 32 can be any conventional device capable of receiving a microphone input signal from the microphone 31 and amplifying the input signal's strength to a level that is readable by the processors of the wireless phone. Carried on microphone-out line 22, the signal output by the sound processor 32 is received by a detector circuit (not shown) within a wireless phone (not shown) for processing. During operation, the impedance-matching device 33 is excited by an audio output signal from the wireless phone. The audio output signal is passed to the loopset 10 through the audio input line 21 and through the gain amplifier 36. The excitation of the impedance-matching device 33 outputs an electromagnetic field across the coil 40. The output electromagnetic field is in direct proportion to the signal input from the audio input line 21. The electromagnetic field is subsequently received by a t-coil hearing aid in proximity to the coil 40.

As one can see from FIG. 3, the battery source 34 supplies operating power to the components contained in the housing 30.

Due to the need for the hearing-impaired user to hear all portions ambient sound surrounding his environment, as well as the user produced sounds (voice, movement, etc.), this application has been described such that the sound processor 32 will combine and transmit, to the coil 40, sounds from the microphone 31, microphone-outline 22 and the audio-out line 21. Should any portion of the sounds resulting from these items not be transmitted to the user, it may be difficult for the user to hear necessary information. Although it is described that these component's outputs have been combined, it should be appreciated that any combination of these sounds may be excluded from the resulting combination without departing from the scope of the invention.

Figure 4:
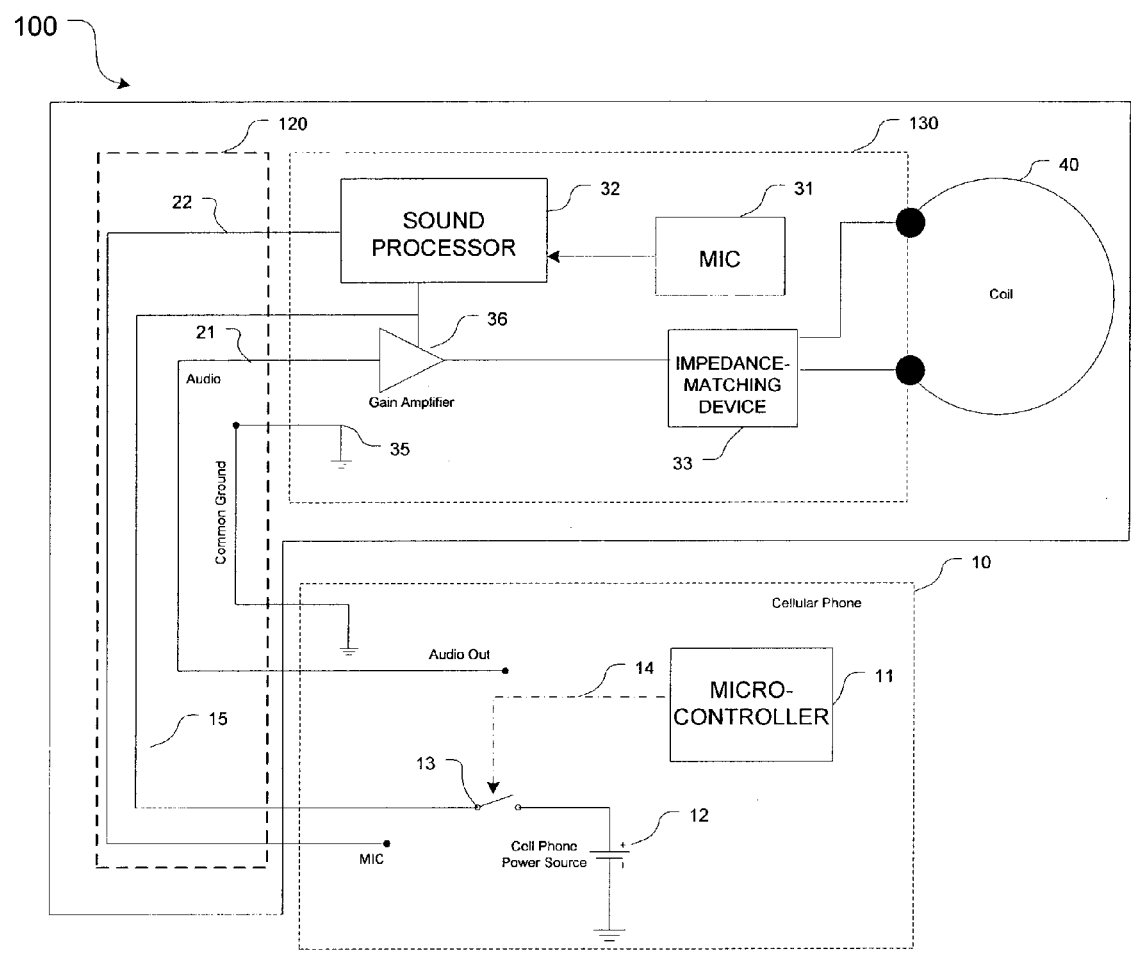
FIG. 4 is a block diagram showing a first exemplary embodiment of a loopset according to this invention.

FIG. 4 shows a first embodiment of the present invention. The loopset 100 comprises a coil 40, a housing 130 and a wire 120. The wire 120 is connected to the wireless phone 10 and to the housing 130. The wireless phone 10 provides voice signals to the loopset 100. The housing 130 contains a microphone 31, a sound processor 32, a gain amplifier 36, an impedance-matching device 33, and a common ground 35. The cable 120 contains a common ground 35, an audio input line 21, a microphone-out line 22 and a power line 15. The power line 15 is connected to switch 13 of the wireless phone and to the control function of the gain amplifier 36. The common ground 35 connects the ground terminal of the housing 130 and the wireless phone 10. The wireless phone 10 also contains a wireless phone battery source 12, a control line 14 and a microcontroller 11. Not shown in FIG. 4 are the other conventional components of the wireless phone 10 known to those skilled in the art that are required for its operation. Those components are not necessarily relevant to the understanding and operation of this invention, thus they have not been illustrated.

In operation, under control of the microcontroller 11, power is selectively supplied to the loopset 100 from the wireless phone battery source 12 across the power connection 15. The operation of the switch 13 is a function of the operation of the relevant features of the wireless phone 10. For example, because the loopset 100 only requires power during an incoming or out going call, when the wireless phone 10 transitions into an idle state from an operation state (i.e., the end of a call), a signal is sent from the microcontroller 11 to the switch 13 across control line 14 to open switch 13 and thereby disconnects the power to the loopset 100. When a call is received or placed from the wireless phone 10, as the microcontroller 11 transitions the cell phone state from the idle state to the operation state, switch 13 closes enabling power to be supplied to the loopset 100 from the cell phone battery source 12.

The microcontroller 11 also controls the operation of the microphone 31 and the emission of the impedance-matching device 33. During certain instances, the microphone 31 may not need to be active while the impedance-matching device 33 is active. For example, when a call is being placed, the microphone 31 does not need to be activated unless the call is connected. However, a user may want to hear tones emitted by the keypad of the wireless phone 10. Table 1 illustrates an example of possible activation states of the microphone 31 and the impedance-matching device 33 of a loopset, as controlled by the microcontroller 11 of the wireless phone 10. In the table, the "○" indicates inactive states and "X" represent active states.

TABLE 1

| | Mic/Coil States | | |
|---|---|---|---|
| Phone State | Mic State | Coil State | Power Switch State |
| Idle | ○ | ○ | open |
| Wake | ○ | X | closed |
| Receive | ○ | X | closed |
| Call Connected | X | X | closed |
| SMS | ○ | X | closed |

It should be appreciated that in a simpler configuration of this invention, the control signals from the microcontroller 11 can simply only provide a switching command to the switch 13 without providing additional commands to control the state of the microphone 31 and the coil 40. In this configuration, the state of the microphone 31 and the coil 40 would be on/off in conjunction with the state of the switch 13.

A still simpler configuration may omit the switch 13 and simply rely on power supplied directly from the wireless phone for its operation.

Figure 5:
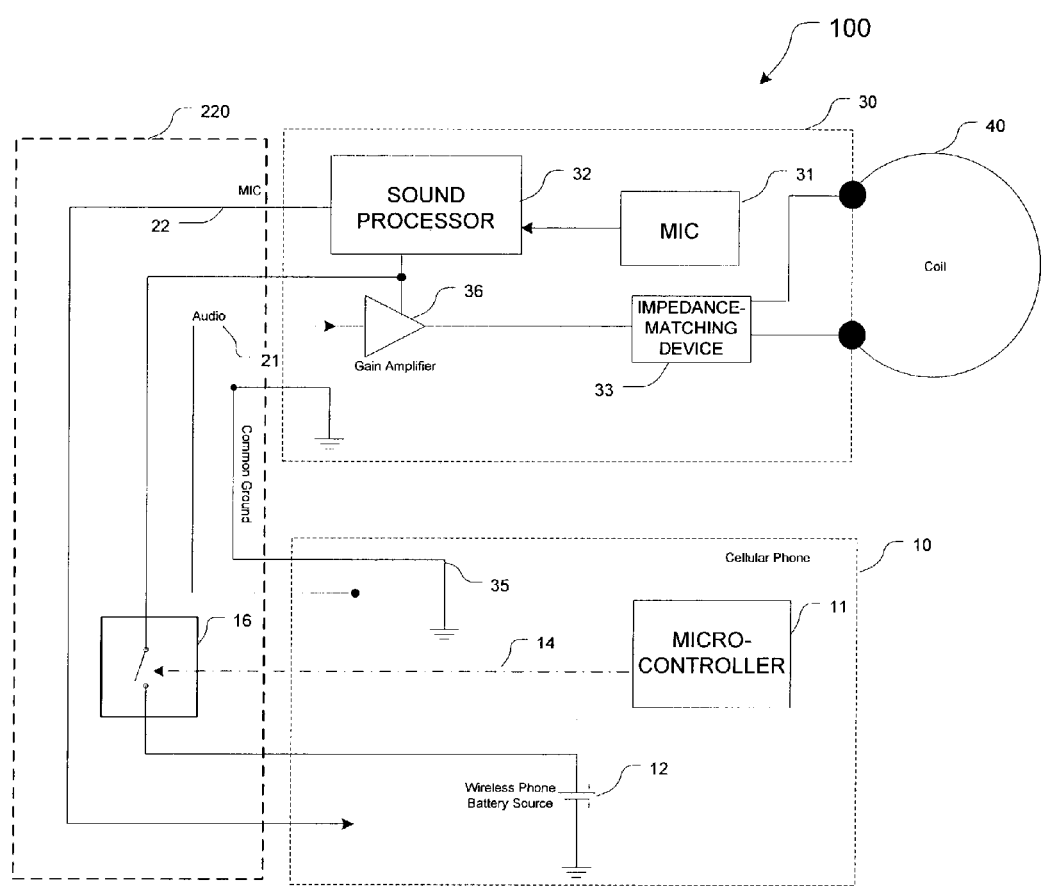
FIG. 5 is a block diagram showing a second exemplary embodiment of a loopset according to this invention.

FIG. 5 illustrates a second embodiment of the claimed invention. This embodiment contains essentially the same items as shown in the first embodiment. However, the switch 16 is placed outside of the wireless phone 10 along the cable 220. This configuration does not require modification of the wireless phone 10 itself. Therefore, the second embodiment can be used with any configuration of current wireless phones with little modification to the microcontroller 11 such that command signals may be sent across command line 14 to control the operation of the switch 16 and ultimately operation of microphone and coil states of the loopset 100.

Figure 6:
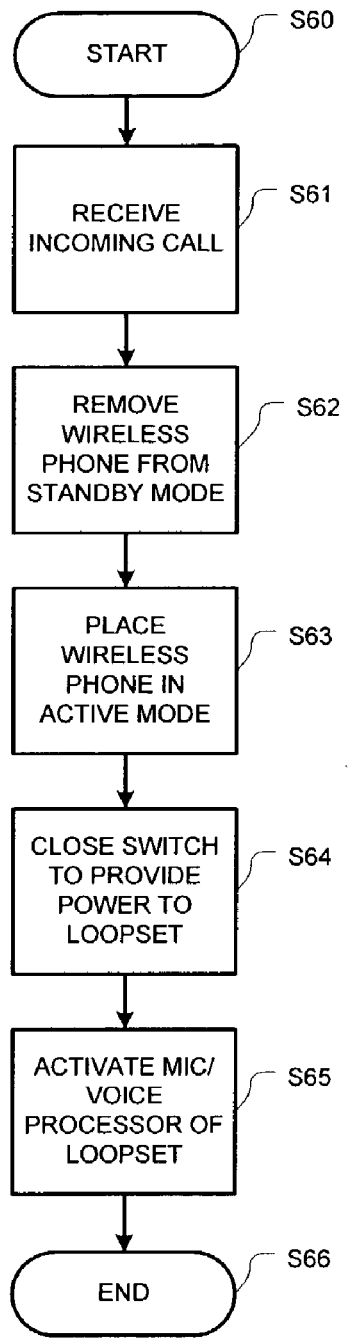
FIG. 6 is a flowchart outlining an exemplary embodiment of a method for providing power to a loopset using the power source of a wireless phone when the wireless phone receives an incoming call.

FIG. 6 is a flowchart outlining one exemplary embodiment of a method of operation of a loopset during an incoming call according to this invention. As shown in FIG. 6, the process begins at step S60, and continues to step S61, where an incoming call is received by the wireless device. The incoming call is received by the wireless phone in a manner that is well known in the art or yet to be developed. Next, in step S62, the wireless phone is removed from the standby mode to the operation mode or "state" consistent with Table 1 by a microcontroller of the wireless phone. The process then continues to step S63 where the wireless phone is placed in a talk mode to establish a voice connection between the wireless phone 10 and the calling party. The process then continues to step S64.

In step S64, the microcontroller of the wireless phone sends a signal to switch 13 to close. Thus, power is provided from the power source of the wireless phone 10 to the connected loopset 100. The process then continues to step S65, wherein the microphone 31 and the sound processor 32 are activated and the loopset 100 begins to transmit the appropriate electromagnetic field to a t-coil hearing aid in proximity to the loopset. Then control ends at step S66.

Figure 7:
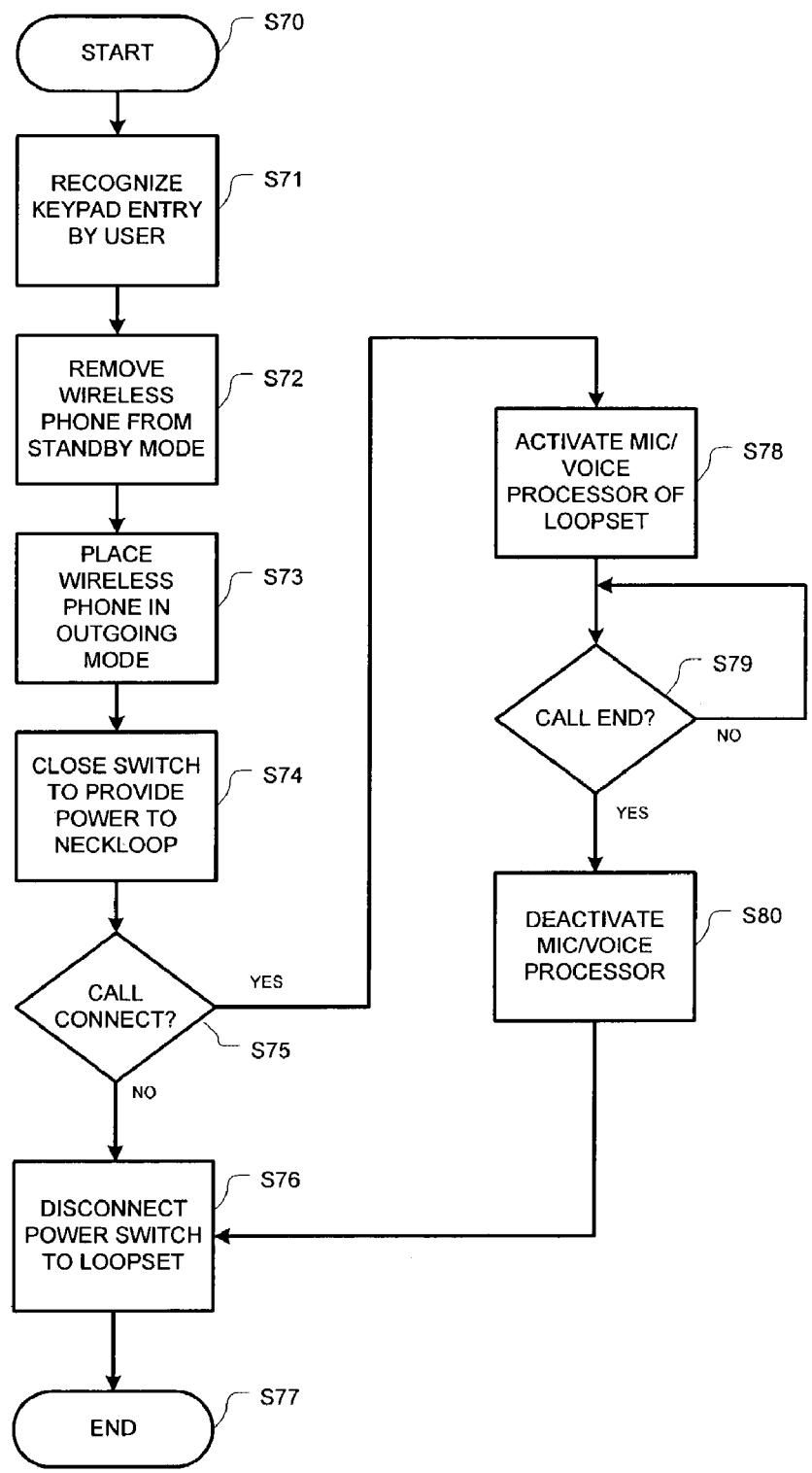
FIG. 7 is a flowchart outlining an exemplary embodiment of a method for providing power to a loopset using the power source of a wireless phone when a user initializes an outgoing call.

FIG. 7 is a flowchart outlining one exemplary embodiment of a method of operation of a loopset 100 during an outgoing call according to this invention. As shown in FIG. 7, the process begins at step S70, and continues to step S71, wherein a microcontroller within a wireless phone 10 recognizes a keypad entry from a user. This keypad entry indicates that the user is making an outgoing call. Next, in step S72, the wireless phone 10 is transitioned from the standby state to the operation state by the microcontroller of the wireless phone. The process then continues to step S73 where the wireless phone is placed in a talk mode ready to respond to a voice connection established by the network between the wireless phone 10 and the called party. The process then continues to step S74.

In step S74, the microcontroller 11 of the wireless phone 10 sends a command to a switch to provide power from the battery of the wireless phone to the connected loopset 100. The process then continues to step S75, wherein the microcontroller 11 determines if the outgoing call has connected within a predetermined amount of time. If the call connects within the predetermined time, the process continues to step S78; otherwise, the process continues to step S76.

In step S78, the microphone 31 and the sound processor 32 are activated when the loopset 100 begins to transmit the appropriate electromagnetic field to a t-coil hearing aid in proximity to the loopset. The process then continues to step S79 where the system monitors to determine when the call has ended. When the call has ended, the process continues to step S80, prior to that time the process loops back to step S79. In step S80, the microprocessor 11 deactivates the microphone 31 and the sound processor 32. The process then continues to step S76.

In step S76, power is disconnected from the loopset 100 by opening switch 13 responsive to a command from microcontroller 11. The process finally ends at step S77.

While this invention has been described in conjunction with the exemplary embodiments outlined above, it is evident that many alternatives, modifications and variations will be apparent to those skilled in the art. For example, the order of some steps of operation could be re-arranged. Accordingly, the exemplary embodiments of the invention, as set forth above are intended to be illustrative, not limiting. Various changes may be made without departing from the spirit and the scope of the invention.

What is claimed:

1. An induction-type loopset for the hearing impaired configured to be connected to a wireless device comprising: a first coil configured to be electromagnetically coupled to a t-coil hearing aid; and an impedance-matching device coupled to the first coil, the impedance-matching device being responsive to an audio signal from a wireless device, and wherein the induction-type loopset is selectively powered from the power source of the wireless device via a switch responsive to an activation state of the wireless device.

2. The loopset of claim 1, further comprising a microphone, wherein the microphone is selectively supplied power responsive to the activation state of the wireless device.

3. The loopset of. claim 2, wherein the microphone is selectively supplied power independently from the power being supplied to the loopset.

4. The loopset of claim 1, wherein the switch is embedded in the wireless device.

5. The loopset of claim 1, wherein the switch is placed in an auxiliary device between the wireless device and the loopset.

6. A method for selectively supplying power to an induction-type loopset for the hearing impaired, comprising the steps of: connecting a wireless device to the loopset; and selectively supplying power to the loopset from the wireless device via a switch responsive to an activation state of the wireless device.

7. The method of claim 6, wherein the step of selectively supplying power comprises the step of detecting a change in the activation state of the wireless device and controlling a switch based on the detecting step.

8. The method of claim 7, wherein the switch is located within the wireless device.

9. The method of claim 7, wherein the switch is located outside of the wireless device.

10. The method of claim 6, wherein the switch is embedded in the wireless device.

11. The method of claim 6, wherein the switch is placed in an auxiliary device between the wireless device and the loopset.

* * * * *